US 6,546,462 B1

United States Patent
Palanca et al.

(10) Patent No.: US 6,546,462 B1
(45) Date of Patent: Apr. 8, 2003

(54) CLFLUSH MICRO-ARCHITECTURAL IMPLEMENTATION METHOD AND SYSTEM

(75) Inventors: Salvador Palanca, Folsom, CA (US); Stephen A. Fischer, Gold River, CA (US); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,759

(22) Filed: Dec. 30, 1999

(51) Int. Cl.[7] .............................................. G06F 12/00
(52) U.S. Cl. ........................ 711/135; 711/144; 711/146
(58) Field of Search ............................... 711/100, 123, 711/122, 135, 141, 144, 146, 154, 133

(56) References Cited

U.S. PATENT DOCUMENTS

| | | | | |
|---|---|---|---|---|
| 4,426,682 A | * | 1/1984 | Riffe et al. | 711/135 |
| 5,214,770 A | * | 5/1993 | Ramanujan et al. | 711/123 |
| 5,408,636 A | * | 4/1995 | Santeler et al. | 711/163 |
| 5,524,233 A | * | 6/1996 | Milburn et al. | 711/141 |
| 5,551,006 A | * | 8/1996 | Kulkarni | 711/146 |
| 5,630,075 A | * | 5/1997 | Joshi et al. | 711/100 |
| 5,768,557 A | * | 6/1998 | Kulkarni | 711/146 |
| 5,860,105 A | * | 1/1999 | McDermott et al. | 711/135 |
| 5,895,488 A | * | 4/1999 | Loechel | 711/135 |
| 5,926,830 A | * | 7/1999 | Feiste | 711/122 |
| 6,021,473 A | * | 2/2000 | Davis et al. | 711/141 |
| 6,122,711 A | * | 9/2000 | Mackenthun et al. | 711/135 |
| 6,145,062 A | * | 11/2000 | Chittor et al. | 711/154 |
| 6,205,521 B1 | * | 3/2001 | Schumann | 711/144 |

OTHER PUBLICATIONS

UltraSPARC™ User's Manual, UltraSPARC–I and UltraSPARC–II, Sun Microsystems, Part No.: 802–7220–02, Palo Alto, CA (Jul. 1997).
PowerPC 604e™, RISC Microprocessor User's Manual with Supplement for PowerPC 604™ Microprocessor, IBM/PowerPC/Motorola, G522–0330–00/MPC604EUM/AD (Mar. 1998).
Power PC 603e and EM603e, RISC Microprocessor Family User's Manual, IBM/PowerPC, G522–0297–00, Rev. 1.1 (May 1998).

* cited by examiner

Primary Examiner—David Hudspeth
Assistant Examiner—Fred F. Tzeng
(74) Attorney, Agent, or Firm—Pillsbury Winthrop LLP (57) ABSTRACT

A system and method for flushing a cache line associated with a linear memory address from all caches in the coherency domain. A cache controller receives a memory address, and determines whether the memory address is stored within the closest cache memory in the coherency domain. If a cache line stores the memory address, it is flushed from the cache. The flush instruction is allocated to a write-combining buffer within the cache controller. The write-combining buffer transmits the information to the bus controller. The bus controller locates instances of the memory address stored within external and intel cache memories within the coherency domain; these instances are flushed. The flush instruction can then be evicted from the write-combining buffer. Control bits may be used to indicate whether a write-combining buffer is allocated to the flush instruction, whether the memory address is stored within the closest cache memory, and whether the flush instruction should be evicted from the write-combining buffer.

53 Claims, 3 Drawing Sheets

CLFLUSH MICRO-ARCHITECTURAL IMPLEMENTATION METHOD AND SYSTEM

BACKGROUND

1. Field of the Invention

The present invention relates in general to computer architecture, and in particular to a method and system that allow a processor to flush a cache line associated with a linear memory address from all caches in the coherency domain.

2. Description of the Related Art

A cache memory device is a small, fast memory that is available to contain the most frequently accessed data (or "words") from a larger, slower memory.

Dynamic random access memory (DRAM) provides large amounts of storage capacity at a relatively low cost. Unfortunately, access to dynamic random access memory is slow relative to the processing speed of modern microprocessors. A cost-effective solution providing cache memory is to provide a static random access memory (SRAM) cache memory, or cache memory physically located on the processor. Even though the storage capacity of the cache memory may be relatively small, it provides high-speed access to the data stored therein.

The operating principle behind cache memory is as follows. The first time an instruction or data location is addressed, it must be accessed from the lower speed memory. The instruction or data is then stored in cache memory. Subsequent accesses to the same instruction or data are done via the faster cache memory, thereby minimizing access time and enhancing overall system performance. However, since the storage capacity of the cache is limited, and typically is much smaller than the storage capacity of system memory, the cache is often filled and some of its contents must be changed as new instructions or data are accessed.

The cache is managed, in various ways, so that it stores the instruction or data most likely to be needed at a given time. When the cache is accessed and contains the requested data, a cache "hit" occurs. Otherwise, if the cache does not contain the requested data, a cache "miss" occurs. Thus, the cache contents are typically managed in an attempt to maximize the cache hit-to-miss ratio.

With current systems, flushing a specific memory address in a cache requires knowledge of the cache memory replacement algorithm.

A cache, in its entirety, may be flushed periodically, or when certain predefined conditions are met. Furthermore, individual cache lines may be flushed as part of a replacement algorithm. In systems that contain a cache, a cache line is the complete data portion that is exchanged between the cache and the main memory. In each case, dirty data is written to main memory. Dirty data is defined as data, not yet written to main memory, in the cache to be flushed or in the cache line to be flushed. Dirty bits, which identify blocks of a cache line containing dirty data, are then cleared. The flushed cache or flushed cache lines can then store new blocks of data.

If a cache flush is scheduled or if predetermined conditions for a cache flush are met, the cache is flushed. That is, all dirty data in the cache is written to the main memory.

For the Intel family of P6 microprocessors (e.g., Pentium II, Celeron), for example, there exists a set of micro-operations used to flush cache lines at specified cache levels given a cache set and way; however, there is not such a micro-operation to flush a cache line given its memory address.

Systems that require high data access continuously flush data as it becomes dirty. The situation is particularly acute in systems that require high data flow between the processor and system memory, such as the case in high-end graphics pixel manipulation for 3-D and video performances. The problems with current systems are that high bandwidth between the cache and system memory is required to accommodate the copies from write combining memory and write back memory.

Thus, what is needed is a method and system that allow a processor to flush the cache line associated with a linear memory address from all caches in the coherency domain.

SUMMARY

The cache line flush (CLFLUSH) micro-architectural implementation process and system allow a processor to flush a cache line associated with a linear memory address from all caches in the coherency domain. The processor receives a memory address. Once the memory address is received, it is determined whether the memory address is stored within a cache memory. If the memory address is stored within the cache, the memory address is flushed from the cache.

BRIEF DESCRIPTION OF THE DRAWINGS

The inventions claimed herein will be described in detail with reference to the drawings in which reference characters identify correspondingly throughout and wherein:

DETAILED DESCRIPTION

By definition, a cache line is either completely valid or completely invalid; a cache line may never been partially valid. For example, when the processor only wishes to read one byte, all the bytes of an applicable cache line must be stored in the cache; otherwise, a cache miss will occur. The cache line forms the actual cache memory. A cache directory is used only for cache management. Cache lines usually contain more data than it is possible to transfer in a single bus cycle. For this reason, most cache controllers implement a burst mode, in which pre-set address sequences enable data to be transferred more quickly through a bus. This is used for cache line fills, or for writing back cache lines, because such these cache lines represent a continuous and aligned address area.

A technique to flush the cache line can be associated with a linear memory address. Upon execution, the technique flushes the cache line associated with the operand from all caches in the coherency domain. In a multi-processor environment, for example, the specified cache line is flushed from all cache hierarchy levels in all microprocessors in the system (i.e. the coherency domain), depending on processor state. The MESI (Modified, Exclusive, Shared, Invalid) protocol, a write-invalidate protocol, gives every cache line one of four states which are managed by two MESI-bits. The four states also identify the four possible states of a cache line. If the processor is found in "exclusive" or "shared" states, the flushing equates to the cache line being invalidated. Another example is true when the processor is found in "modified" state. If a cache controller implements a write-back strategy and, with a cache hit, only writes data from the processor to its cache, the cache line content must be transferred to the main memory, and the cache line is invalidated.

When compared to other memory macroinstructions, the cache line flush (CLFLUSH) method is not strongly ordered, regardless of the memory type associated with the cache line flush macroinstruction. In contrast, the behavior in the memory sub-system of the processor is weakly ordered. Other macro-instructions, can be used to strongly order and guarantee memory access loads, stores, fences, and other serializing instructions, immediately prior to and right after CLFLUSH.

A micro-operation, named "clflush_micro_op" is used to implement the CLFLUSH macroinstruction.

Figure 1:
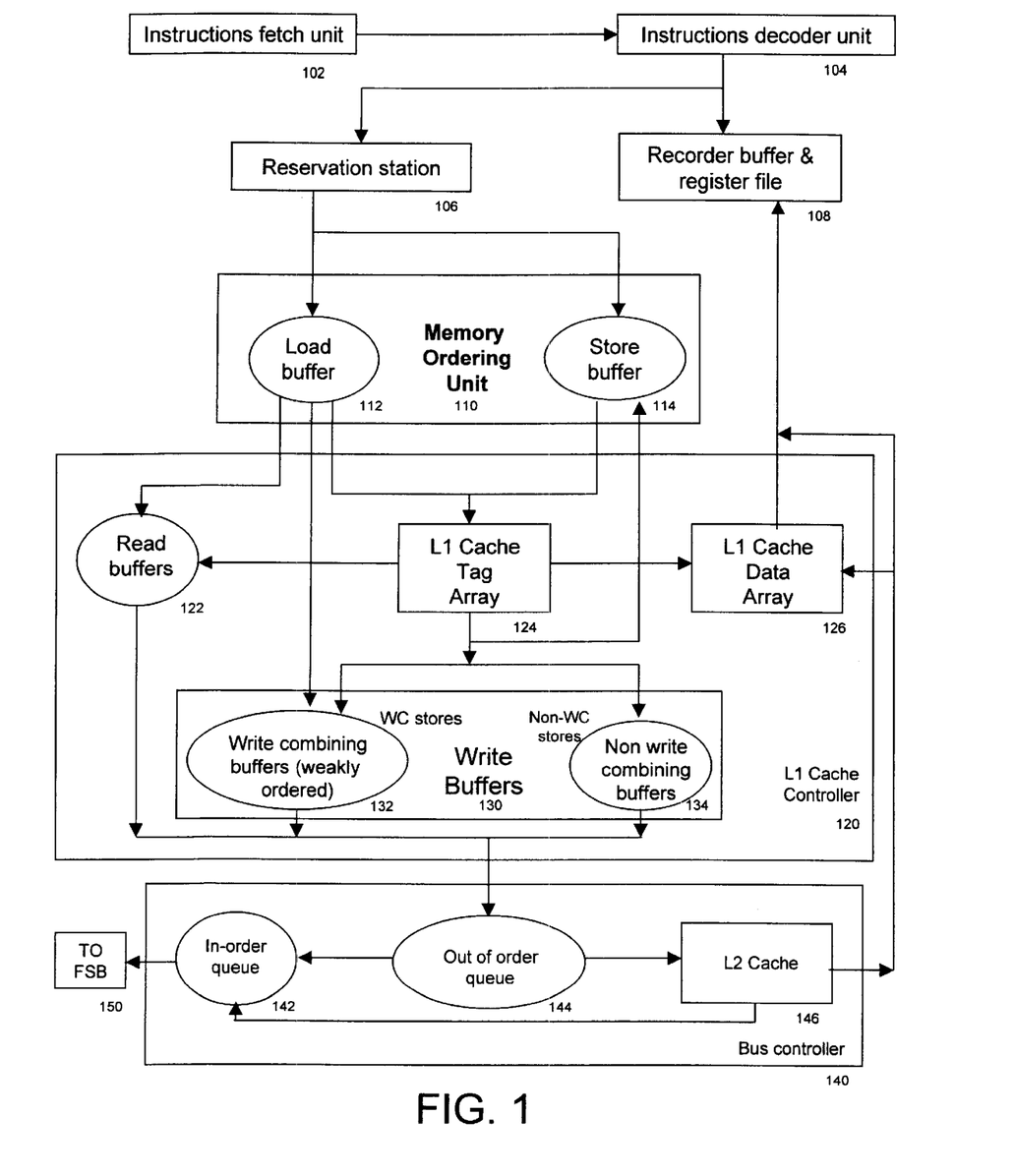
FIG. 1 illustrates a microprocessor architecture.

Moving to FIG. 1, an example microprocessor's memory and bus subsystems is shown with the flow of loads and stores. In FIG. 1, two cache levels are assumed in the microprocessor: an on-chip ("L1") cache being the cache level closest to the processor, and second level ("L2") cache being the cache level farthest from the processor. An instruction fetch unit 102 fetches macroinstructions for an instructions decoder unit 104. The decoder unit 104 decodes the macroinstructions into a stream of microinstructions, which are forwarded to a reservation station 106, and a reorder buffer and register file 108. As an instruction enters the memory subsystem, it is allocated in the load 112 or store buffer 114, depending on whether it is a read or a write memory macroinstruction, respectively. In the unit of the memory subsystem where such buffers reside, the instruction goes through memory ordering checks by the memory ordering unit 110. If no memory dependencies exist, the instruction is dispatched to the next unit in the memory subsystem after undergoing the physical address translation. At the L1 cache controller 120, it is determined whether there is an L1 cache hit or miss. In the case of a miss, the instruction is allocated into a set of buffers, from where it is dispatched to the bus sub-system 140 of the microprocessor. In case of a cacheable load miss, the instruction is sent to read buffers, 122, or in the case of a cacheable store miss, the instruction is sent to write buffers 130. The write buffers may be either weakly ordered write combining buffers 132 or non-write combining buffers 134. In the bus controller unit 140, the read or write micro-operation is allocated into an out-of-order queue 144. If the micro-operation is cacheable, the L2 cache 146 is checked for a hit/miss. If a miss, the instruction is sent through an in-order queue 142 to the frontside bus 150 to retrieve or update the desired data from main memory.

Figure 2A:
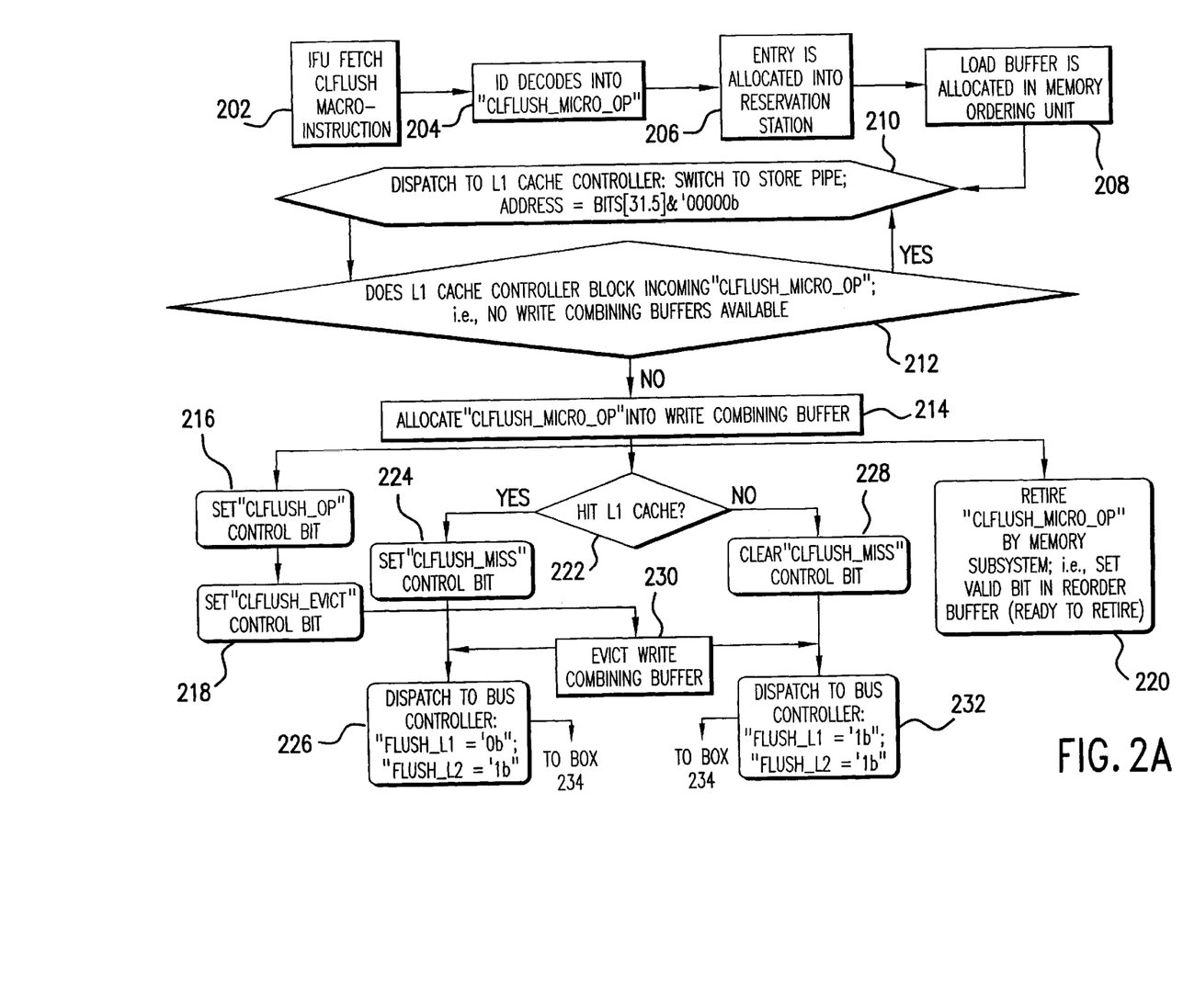
FIGS. 2A and 2B illustrate in flowchart form an embodiment of the cache line flush process.
Figure 2B:
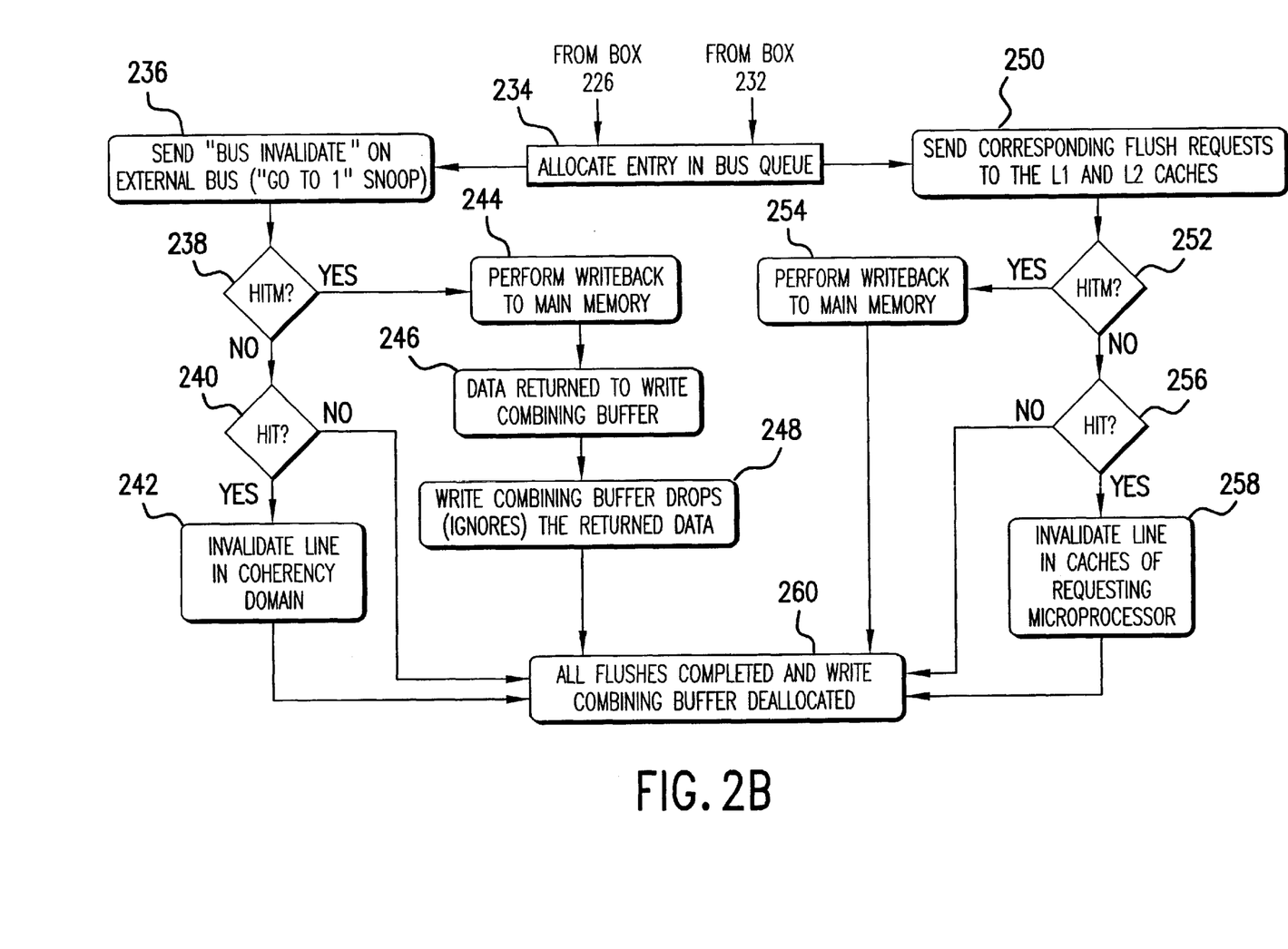

The flow of the "clflush_micro_op" micro-operation through the processor memory subsystem is also described in FIG. 2A and B. Initially, the instruction fetch unit 102 retrieves a cache line flush instruction, block 202. In block 204, the cache line flush instruction is decoded into the "clflush_micro_op" micro-operation by the instructions decoder unit 104. The micro-operation is then forwarded to a reservation station 106, and a recorder buffer and register file 108, block 206. The "clflush_micro_op" micro-operation is dispatched to the memory subsystem on a load port, block 208. It is allocated an entry in the load buffer 112 in the memory ordering unit 110. For split accesses calculation in the memory ordering unit 110, the data size of the micro operation is masked to one byte in order to avoid cache line splits; however, upon execution, the whole cache line will be flushed.

The behavior of the "clflush_micro_op" in the memory-ordering unit 110 is speculative. Simply put, this means that the "clflush_micro_op" can execute out of order respect to other CLFLUSH macroinstructions, loads and stores. Unless memory access fencing (termed "MFENCE") instructions are used appropriately, (immediately before and after of the CLFLUSH macro-instruction), execution of the "clflush_micro_op" with respect other memory loads and stores is not guaranteed to be in order, provided there are no address dependencies. The behavior of CLFLUSH through the memory subsystem is weakly ordered. The following tables list the ordering constraints on CLFLUSH. Table 1 lists the ordering constraint affects of later memory access commands compared to an earlier CLFLUSH. Table 2 lists the converse of table 1, displaying the ordering constraint affects of earlier memory access commands compared to a later CLFLUSH instruction. The memory access types listed are uncacheable (UC) memory, write back (WB) memory, and uncacheable speculative write combining (USWC) memory accesses.

TABLE 1

Memory ordering of instructions with respect to an older CLFLUSH

| | Later access | | | | | | | |
|---|---|---|---|---|---|---|---|---|
| | UC memory | | WB memory | | USWC memory | | | |
| Earlier access | Load | Store | Load | Store | Load | Store | CLFLUSH | MFENCE |
| CLFLUSH | N | N | Y | Y | Y | Y | Y | N |

Note:
N = Cannot pass,
Y = can pass.

TABLE 2

Memory ordering of instructions with respect to a younger CLFLUSH

| | | Later access |
|---|---|---|
| | Earlier access | CLFLUSH |
| UC memory | Load | Y |
| | Store | Y |
| WB memory | Load | Y |
| | Store | Y |
| USWC memory | Load | Y |
| | Store | Y |
| | CLFLUSH | Y |
| | MFENCE | N |

From the memory-ordering unit 110, the "clflush_micro_op" micro-operation is dispatched to the L1 cache controller unit 120, block 210. The "clflush_micro_op"

micro-operation is dispatched on the load port; however, it is allocated in a write combining buffer 132, as if it were a store. From the L1 cache controller unit forward, the "clflush_micro_op" is switched from the load to the store pipe.

Decision block 212 determines whether no write combining buffers 132 are available. If none are available, flow returns to block 210. Otherwise, flow continues into block 214. Regardless of the memory type and whether it hits or misses the L1 cache, a write combining buffer 132 is allocated to service an incoming "clflush_micro_op," block 214. A control field is added to each write combining buffer 132 in the L1 cache controller unit to determine which self-snoop attributes need to be sent to the bus controller 140. This control bit, named "clflush_miss," is set exclusively for a "clflush_micro_op" that misses the L1 cache.

Upon entering the memory sub-system of the microprocessor, several bits of the address that enable cache line access of a "clflush_micro_op" are zeroed out, block 216. In the Pentium pro family of microprocessors, these would be the lower five bits of the address (address[4:0]). This is done in both the L1 cache and L2 cache controller units 120, upon executing the flush command. The zeroing out helps to determine a cache line hit or miss. Since only tag match determines a hit or miss, no byte enable comparison is needed. Note that by definition, no partial hit is possible. A hit or miss is always full line hit or miss. Zeroing out the address bits [4:0] also provides an alternative mechanism to the one used in the memory ordering unit 110 to mask line split accesses. In split accesses the data size of the transaction is masked one byte.

Another control bit added to each write combining buffer 132 in the L1 cache controller unit 120 is used to differentiate between a write combining buffer 132 allocated for a "clflush_micro_op" and another one allocated for a write combining store, block 218. This control bit, named "clflush_op," is exclusively set for those write combining buffers allocated to service a "clflush_micro_op". It is used to select the request type and flush attributes sent from the L1 cache controller 120 to the bus controller 140.

In the case of an L1 cache hit, as determined by decision block 222, both "flush L1" and "flush L2" attributes are sent to the bus controller 140 upon dispatch from the L1 cache controller unit 120, blocks 224 and 226. The bus controller 140 contains both the L2 cache 146 and external bus controller units.

Alternatively, in the case of a L1 cache miss, as determined by decision block 222, the "clflush_miss" control bit is set, and only the "flush L2" attribute is sent blocks 228 and 232. This helps improve performance by omitting the internal self-snoop to the L1 cache.

Upon its dispatch from the memory-ordering unit 110, the "clflush_micro_op" micro-operation is blocked by the L1 cache controller unit 120 if there are no write combining buffers 132 available, block 212. In such a case, it also evicts a write-combining buffer 132, as pointed by the write-combining circular allocation pointer. This guarantees no deadlock conditions due to the lack of free write combining buffers 132. If blocked, the "clflush_micro_op" is redispatched once the blocking condition is removed. An example that would cause the dispatching of the "clflush_micro_op" instruction is the completed eviction of a previously allocated write-combining buffer 132.

The "clflush_micro_op" micro-operation is retired by the memory subsystem upon being allocated into a write-combining buffer 132 in the L1 cache controller 120. This allows pipelining: subsequent instructions to proceed with execution prior to completion of the "clflush_micro_op" micro-operation. The pipelining improves the overall performance of the system.

There are two methods to evict a write-combining buffer servicing a "clflush_micro_op" micro-operation.

A write combining buffer 132 servicing a "clflush_micro_op" will be evicted by the same current eviction conditions that currently apply to write combining buffers 132 in the family of Intel P6 microprocessors. Moreover, fencing macroinstructions also evict a write-combining buffer that services a "clflush_micro_op" micro-operation.

Additionally, some embodiments evict a "clflush_micro_op" exclusively. This is done to avoid leaving stranded (pending) a write combining buffer servicing a "clflush_micro_op" for a long period of time, when the programmer does not want to enforce ordering, and a fencing instruction is not used. A control bit, named "clflush_evict", is associated with each write-combining buffer 132 servicing a "clflush_micro_op". This control bit is set when a write combining buffer 132 is allocated to a "clflush_micro_op." Once the "clflush_evict" bit is set, the corresponding write combining buffer is marked for eviction and the control bit is reset, block 230. This eviction condition applies exclusively to write combining buffers 132 servicing a "clflush_micro_op" micro-operation. It improves performance of programs using CLFLUSH by not allowing "clflush_micro_op" micro-operations to take up the write combining buffer 132 resources for extended periods of time, and consequently, freeing them up for other write combining operations.

TABLE 3

Memory to Bus Transactions for CLFLUSH

| "Clflush_miss" control bit | "Clflush_op" control bit | Request type | "Flush L1" attriute | "Flush L2" attribute | New transaction |
| --- | --- | --- | --- | --- | --- |
| '0 | '0 | Non-CLFLUSH | — | — | NO |
| '0 | '1 | CLFLUSH | '1 | '1 | YES |
| '1 | '0 | N/A | N/A | N/A | Illegal combination |
| '1 | '1 | CLFLUSH | '0 | '1 | YES |

Note that if "Clflush_miss"="clflush_op"='0,' the request type is any of the existing transactions in the P6 family of microprocessors (but not CLFLUSH), and the flush attributes will be set/cleared accordingly.

Table 4 below shows the conditions under which the three write combining buffer 132 control bits are set and reset. The "clflush_evict" control bit can only be set after the "clflush_micro_op" control bit. The "clflush_micro_op" control bit will be set on speculative write combining buffer 132 allocations, while "clflush_evict" will exclusively be set on a real write combining buffer 132 allocation for a "clflush_op". The "clflush_miss" control bit is also set on speculative write combining buffer 132 allocations, if the "clflush_micro_op" misses the L1 cache. Both, the "clflush_miss" and "clflush_op" control bits are cleared upon speculative allocation of a write-combining buffer 132 to service any instruction other than a "clflush_micro_op." Functionally, this is similar to clearing such control bits upon deallocation of a write-combining buffer servicing a "clflush_micro_op." In a processor implementation, the same write buffers 130 are shared for write combining and non-write combining micro operations. The "clflush_miss" and "clflush_micro_op" bits are cleared upon speculative allocation of any write buffer 130, not just a write combining buffer 132. This behavior ensures that the three control bits can never be set for a write buffer 130 not servicing a "clflush_micro_op." In a processor implementation, where all L1 cache controller buffers are shared for both reads and writes, such as in the family of P6 microprocessors, the "clflush_miss" and "clflush_micro_op" control bits only need to be cleared upon allocation of a buffer to service a store, block 234. Buffers allocated to service loads ignore the value of these three new control bits.

TABLE 4

Conditions to set/clear the new control bits of a write-combining buffer in the L1 cache controller

| Control bit | Set | Clear |
|---|---|---|
| "Clflush_op" | Upon allocation of a write combining buffer to service a "clflush_micro_op" | Upon allocation of a write buffer for something other than a "clflush_micro_op" |
| "Clflush_evict" | Immediately after allocation of a write combining buffer to service a "clflush_micro_op" (i.e., WC buffer allocated, "in use", and "clflush_op" control bit set) | Upon eviction of a write combining buffer (i.e., "WC mode" control bit set) |
| "Clflush_miss" | Upon allocation in a write combining buffer of a "clflush_micro_op" that misses the L1 cache | Upon allocation of a write buffer for something other than a "clflush_micro_op" "clflush_miss" |

Note that all three new WC buffer control bits are cleared upon a "reset" sequence as well.

Embodiments may be implemented utilizing the bus controller 140. When a write-combining buffer 132 servicing a "clflush_micro_op" is marked for eviction, it is dispatched to the bus controller 140, block 236. The request sent is the same as if it was for a full line cacheable write combining transaction, except for the self-snoop attributes. Snooping is used to verify the presence of a specific memory address is present in the applicable cache. For a "clflush_micro_op" eviction, the bus controller 140 self-snoops the L1 and L2 caches based on the "flush L1" and "flush L2" request attributes, block 250. Furthermore, the bus controller 140 issues a "bus read invalidate line" on the external bus, block 236. If the L1 cache controller unit 120 determines an L1 cache miss, for example, no "flush L1" message is sent. The "bus read invalidate line" transaction flushes hits to the same line in any other caches in the coherency domain. On the external bus transaction, all byte enables are deasserted, masking the data phase from the core. Decision blocks 238 and 252 determine whether a hit for a modified cache line (HITM) has occurred in another cache within the coherency domain (i.e., not the L1 or L2 caches in the requesting microprocessor). If the HITM occurs, the cache that is hit does a write back to main memory, and data is returned to the requesting microprocessor in blocks 244 and 254. The write combining buffer 132 in the L1 cache controller unit 120 remains allocated until completion of the snoop phase and possible transfer of data back from another cache in the coherency domain, for example, a HITM on an external bus. Data coming back to the write-combining buffer 132 as a result of the snoop phase or inquiry cycle is ignored, blocks 246 and 248.

All flushes are then completed, and the write combining buffers 132 are deallocated in block 260.

Table 5 below shows how the external bus controller 140 treats all write-combining evictions. The request from the L1 cache to the bus controller 140 for a "clflush_micro_op" eviction, such as the CLFLUSH macro-instruction, can be overloaded on the same request signals as that for a full line cacheable write combining eviction; however, the self-snoop attributes differ.

TABLE 5

External bus controller transactions for write combining evictions

| Request type | External bus transaction | Transaction length | Byte enables | Flush L1 | Flush L2 | New |
|---|---|---|---|---|---|---|
| Partial cacheable write combining | Read Invalidate | 32 byte | All byte enables asserted | NO | NO | NO |
| Full line cacheable write combining | Invalidate | 32 byte | All byte enables deasserted | NO | NO | NO |
| Partial uncacheable write combining | Memory write (write type) | <=8 byte | Byte enables as sent from L1 cache controller unit | NO | Only non-temporal stores that miss L1 cache | NO |
| Full line uncacheable write combining | Memory write (write-back type) | 32 byte | All byte enables asserted | NO | Only non-temporal stores that miss L1 cache | NO |
| CLFLUSH | Bus Read Invalidate | 32 byte | All byte enables deasserted | Only L1 hits | YES | YES |

Note: USWC stores are not memory aliased in the P6 family of microprocessors, and therefore, they are not self-snooped.

For testability and debug purposes, a non-user visible mode bit can be added to enable/disable the CLFLUSH macroinstruction. If disabled, the L1 cache controller unit 120 treats the incoming "clflush_micro_op" microoperation as a No-Operation-Opcode ("NOP"), and it never allocates a write-combining buffer 132. This NOP behavior can be implemented on uncacheable data prefetches.

The previous description of the embodiments is provided to enable any person skilled in the art to make or use the system and method. It is well understood by those in the art, that the preceding embodiments may be implemented using hardware, firmware, or instructions encoded on a computer-readable medium. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A process comprising:
   receiving an instruction having an operand which indicates a memory address;
   generating a first type of bus transaction indicating the memory address in response to the instruction, whether a cache entry corresponding to the memory address is in a modified state or in another state other than the modified state
   performing a self snoop to cause flushing of a cache line including the memory address; and
   performing a write tacK in response to the self snoop if the cache line is in the modified state.

2. The process of claim 1 wherein the associated memory address is a linear address, further comprising:
   translating the linear address to determine the memory address.

3. The process of claim 1 wherein the first type of bus transaction comprises an invalidating bus transaction, and the invalidating bus transaction is performed by a bus agent whether or not the memory address is cached by the bus agent.

4. The process of claim 3 wherein the first type of bus transaction comprises a zero length memory access.

5. The process of claim 1 wherein the instruction is a cache line flush instruction, further comprising:
   executing, by a processor, a plurality of other cache line flush operations out of order with respect to the cache line flush instruction, wherein the cache line flush instruction is also executed by the processor.

6. The process of claim 5 further comprising:
   executing the cache line flush instruction out of order with respect to a plurality of load and store instructions to uncacheable, writeback, and uncacheable speculative write combining memory type locations executed by the processor; and
   maintaining order of the cache line flush instruction with respect to memory fence instructions executed by the processor.

7. A process comprising:
   receiving a cache line flush instruction having an associated memory address; and
   flushing each instance of the memory address stored within cache memories in a coherency domain by generating a single type of bus transaction in response to the cache line flush instruction regardless of a state of or presence or absence of a cache line corresponding to the memory address in a cache associated with a bus agent executing the cache line flush instruction.

8. The process of claim 7 wherein flushing further comprises:
   performing a self snoop to flush the associated memory address from the first bus agent.

9. The process of claim 7 wherein flushing comprises generating a zero length access and an invalidation request.

10. The process of claim 7 wherein at least one bus transaction to request invalidation is generated for each cache line implicated by an operand of an executed cache line flush instruction.

11. An apparatus comprising:
    a cache memory; and
    a cache controller, the cache controller being operative to receive a memory address which is indicated by an operand of an instruction, wherein the cache controller is to flush a cache line associated with the memory address stored within the cache memory; and
    a first bus controller to generate a predetermined bus transaction indicating the memory address in response to the instruction, whether the memory address is cached in a modified state or in another state in the cache memory.

12. The apparatus of claim 11, wherein the predetermined bus transaction is to request invalidation of a cache location corresponding to the memory address, further comprising:
    at least one external cache memory; and
    a second bus controller to receive the memory address from the first bus controller and to flush instances of the memory address stored within the at least one external cache memory.

13. The apparatus of claim 11, the cache controller further comprising write combining buffers operative to communicate to the bus controller, wherein one of the write combining buffers is allocated in response to the instruction to store an entry indicative of a cache flush operation without data from the cache memory corresponding to the memory address despite data corresponding to the memory address being present in the cache memory in the modified state, and further wherein the apparatus is to generate a self snoop which provides data for a separate bus transaction to write back the cache line associated with the memory address.

14. The apparatus of claim 11 wherein the bus transaction comprises a zero length access and an indication to perform an invalidation.

15. The apparatus of claim 11 wherein the apparatus is a processor and the instruction is a cache line flush instruction which is weakly ordered and can be executed by the processor out of order with respect to other instances of the cache line flush instruction executed by the processor.

16. The apparatus of claim 11 implemented using any combination of one or more of hardware, firmware, and instructions on a computer readable medium.

17. A computer architecture comprising:
    a closest cache memory within a coherency domain;
    at least one external cache memory within the coherency domain;
    a cache controller with a write combining buffer, the cache controller being operative to receive a memory address, to determine whether the memory address is stored within the closest cache memory in the coherency domain, to flush the cache line associated with the memory address stored within the closest cache memory in the coherency domain, and to allocate the write combining buffer to a flush instruction with the memory address; and
    a bus controller, the bus controller being operative to receive the memory address from the write combining buffer and to flush instances of the memory address stored within the external cache memory within the coherency domain.

18. The architecture of claim 17, the bus controller receiving a first control bit indicating whether a write-combining buffer is allocated to the flush instruction with the memory address.

19. The architecture of claim 18, the bus controller further receiving a second control bit indicating whether the memory address is stored within the closest cache memory in the coherency domain.

20. The architecture of claim 19, the bus controller further receiving a third control bit indicating whether the flush instruction with the memory address should be evicted from the write-combining buffer.

21. A process comprising:
receiving a memory address by a cache controller;
determining whether the memory address is stored within a closest cache memory in a coherency domain,
flushing the cache line associated with the memory address stored within the closest cache memory in the coherency domain;
allocating a flush instruction with the memory address to a write combining buffer;
transmitting the flush instruction with the memory address to a bus controller through the write combining buffer;
locating instances of the memory address stored within external cache memory within the coherency domain; and
flushing instances of the memory address stored within the external cache memory within the coherency domain.

22. The process of claim 21 wherein a first control bit indicates to the bus controller whether a write-combining buffer is allocated to the flush instruction with the memory address.

23. The process of claim 22 wherein a second control bit indicates to the bus controller whether the memory address is stored within the closest cache memory in the coherency domain.

24. The process of claim 23 further comprising:
evicting the flush instruction with the memory address from the write-combining buffer.

25. The process of claim 24 wherein a third control bit indicates to the bus controller the flush instruction with de memory address should be evicted from the write-combining buffer.

26. An apparatus comprising:
a cache memory;
control logic that, in response to an instruction having an associated address indicating a memory location, generates a first type of transaction requesting invalidation of the memory location in other caches regardless of a state of or presence or absence of data for the memory location in the cache memory, and flushes the memory location from the cache memory, wherein the instruction is a cache line flush instruction, and wherein the associated address is a linear address which is an operand to the cache line flush instruction, and further wherein the first type of transaction is a zero length memory access and invalidate bus cycle that conveys a physical address which is a translation of the linear address.

27. The apparatus of claim 26 wherein the instruction is a weakly ordered instruction which can be executed out of order by the apparatus with respect to other instances of the instruction executed by the apparatus.

28. The apparatus of claim 26 wherein the control logic, in response to the instruction, causes a snoop of the cache memory which invalidates a cache line corresponding to the associated address.

29. The apparatus of claim 26 wherein the control logic comprises:
an instruction fetch unit to fetch the instruction, wherein the instruction is a cache line flush instruction;
an instruction decoder unit to decode the cache line flush instruction to generate a micro-operation;
a reservation station to receive the micro-operation from the instruction decoder unit;
a memory ordering unit to allow the micro-operation to be reordered with respect to other micro-operations but not with respect to fence micro-operations, the other micro-operations being load micro-operations, store micro-operations, and cache line flush micro-operations; and
a bus controller having a bus queue to queue bus transactions.

30. The apparatus of claim 29 further comprising a plurality of write combining buffers, wherein an entry is to be allocated in the plurality of write combining buffers in response to the instruction, and further wherein the entry indicates a cache line flush operation but is allocated without data associated with the memory location from the cache memory.

31. The apparatus of claim 30 wherein the memory ordering unit considers a data size of the micro-operation to be one byte for a split access calculation.

32. The apparatus of claim 30 wherein an entry for the cache line flush instruction is allocated in a write combining buffer as if the cache line flush instruction were a store, and further wherein the micro-operation is dispatched from a load port.

33. The apparatus of claim 32 wherein the memory location is flushed from the cache memory in response to a self snoop initiated by the control logic, and further wherein the self snoop is initiated only if a hit in the cache memory previously occurred in response to the instruction and associated address.

34. The apparatus of claim 26 wherein the first type of transaction comprises a memory access and an indication of a request to invalidate.

35. The apparatus of claim 26 wherein the control logic, in response to the instruction, is to generate at least one bus transaction indicating an implicated cache line for each associated address associated with any instance of the instruction that completes execution.

36. An apparatus comprising:
a cache memory;
instruction fetch logic to fetch a cache flush macroinstruction, the cache flush macroinstruction having an operand that indicates a memory address;
decode logic to decode the cache flush macroinstruction into a micro-operation;
execution logic;
memory ordering logic to allow the micro-operation to be reordered to complete execution by the execution logic out of order with respect to other micro-operations from other cache flush macroinstructions also executed by the execution logic; and
a bus controller that, in response to the micro-operation, generates an invalidate transaction indicative of the memory address and is to cause flushing of a memory location corresponding to the memory address from the cache memory.

37. The apparatus of claim 36 further comprising:
a plurality of write combining buffers, wherein a cache flush operation is received by the write combining buffers without data from the memory address from the cache memory.

38. The apparatus of claim 36, wherein the memory ordering logic allows reordering of the micro-operation with respect to load and store instructions processed by the memory ordering logic to any of uncacheable, writeback, and uncacheable speculative write combining memory type locations, but not with respect to a fence instruction.

39. The apparatus of claim 36, wherein the invalidate transaction is a single type of transaction that is generated in response to the micro-operation regardless of a state or presence or absence of a cache line corresponding to the memory address in the cache.

40. The apparatus of claim 39, wherein the invalidate transaction comprises a zero length memory access and an indication to invalidate the cache line.

41. A system comprising:
a first processor having a first cache caching a first modified data value at a first address;
a second processor having a second cache to cache a second modified data value at a second address, execute a first cache line flush instruction indicating the first address and a second cache line flush instruction indicating the second address, and
in response to the first and second cache line flush instructions to generate a first instance of a first type of bus cycle and a second instance of the first type of bus cycle to the first processor,
wherein the first processor writes back the first modified data value in response to the first instance of the first type of bus cycle generated by the second processor, and further wherein the second processor writes back the second modified data value for the second instance of the first type of bus cycle.

42. The system of claim 41 wherein the first type of bus cycle is generated in response to execution of a cache line flush instruction by the second processor regardless of presence or absence of or a state of a cache line corresponding to an address indicated by the cache line flush instruction in a cache of the second processor.

43. The system of claim 42 wherein the cache line flush instruction is a weakly ordered instruction executable out of order with respect to other memory operations including other cache line flush instructions executed by a single processor.

44. The system of claim 41 wherein the cycle comprises an access of zero length and invalidate line indication.

45. An apparatus comprising:
a cache;
an instruction fetch unit to receive a cache flush instruction having a linear address as an operand;
ordering logic to allow the cache flush instruction to execute out of order with respect to other instructions including other load and store instructions and other instances of the cache flush instruction; and
control logic to invalidate a cache line in the cache corresponding to the linear address if present in the cache and to signal other caches to invalidate any present cache lines corresponding to the linear address.

46. The apparatus of claim 45 wherein the control logic is to signal other caches regardless of a state of or presence or absence of the cache line in the cache.

47. The apparatus of claim 46 wherein the control logic is to generate a single type of bus transaction in response to the cache flush instruction regardless of a state of or presence or absence of the cache line in the cache.

48. The apparatus of claim 45 wherein the control logic is to invalidate the cache line as a part of a self snoop performed in conjunction with snooping other caches.

49. A system comprising:
a bus;
a main memory coupled to the bus; and
a plurality of caching agents coupled to the bus forming a coherency domain, wherein execution of a cache line flush instruction implicating a cache line by an executing one of the plurality of caching agents is to cause invalidation of the cache line in all of the plurality of caching agents in the coherency domain by generating a first type of bus transaction received by the plurality of caching agents whether or not the cache line is modified in the executing one of the plurality of caching agents.

50. The system of claim 49 wherein the executing one of the plurality of caching agents is to generate a memory access and invalidate cycle to snoop caches of each of the plurality of caching agents.

51. The system of claim 50 wherein the memory access and invalidate cycle comprises a zero length memory transaction and an indication requesting that an invalidation be performed.

52. The system of claim 51 wherein any one of the plurality of caching agents that is caching the cache line in a modified form, including the executing one, is to provide the cache line for the first type of bus transaction when it occurs.

53. The system of claim 52 further comprising means for buffering the cache line flush instruction wit a caching agent.

* * * * *

UNITED STATES PATENT AND TRADEMARK OFFICE
CERTIFICATE OF CORRECTION

PATENT NO. : 6,546,462 B1
APPLICATION NO. : 09/475759
DATED : April 8, 2003
INVENTOR(S) : Palanca et al.

It is certified that error appears in the above-identified patent and that said Letters Patent is hereby corrected as shown below:

In column 9, at line 22 claim 1, delete "tacK" and insert --back--.

In column 11, at line 42 claim 25, delete "de" and insert --the--.

In column 14, at line 50 claim 53, delete "wit" and insert --within--.

Signed and Sealed this

Twenty-fifth Day of March, 2008

JON W. DUDAS
*Director of the United States Patent and Trademark Office*